United States Patent [19]

Newman et al.

[11] Patent Number: 4,939,660
[45] Date of Patent: Jul. 3, 1990

[54] FUEL CONSERVING CRUISE SYSTEM FOR A MARINE DRIVE UNIT

[75] Inventors: Neil A. Newman, Omro; Herbert A. Bankstahl; John M. Griffiths, both of Fond du Lac; Lyle M. Forsgren, Oshkosh; Wayne T. Beck, Fond du Lac, all of Wis.

[73] Assignee: Brunswick Corporation, Skokie, Ill.

[21] Appl. No.: 235,329

[22] Filed: Aug. 23, 1988

[51] Int. Cl.$^5$ .............................................. B63H 21/26
[52] U.S. Cl. ........................................ 364/442; 440/1; 440/61
[58] Field of Search .................... 364/442, 443, 431.01; 318/588; 114/274–277, 280, 285; 440/1, 53, 61, 84, 87

[56] References Cited

U.S. PATENT DOCUMENTS

| | | | |
|---|---|---|---|
| 2,782,744 | 6/1954 | Staley | 440/63 |
| 3,990,660 | 9/1976 | Pipoz | 440/61 |
| 4,013,249 | 3/1977 | Meyer et al. | 440/61 |
| 4,168,818 | 9/1979 | Ellis | 440/53 |
| 4,318,699 | 3/1982 | Wenstadt et al. | 440/1 |
| 4,605,375 | 8/1986 | Ferguson | 440/61 |
| 4,673,358 | 6/1987 | Iwai et al. | 440/61 |
| 4,682,961 | 7/1987 | Nakahama | 440/61 |
| 4,718,872 | 1/1988 | Olson et al. | 440/1 |
| 4,759,732 | 8/1988 | Atsumi | 440/1 |
| 4,762,079 | 8/1988 | Takeuchi et al. | 114/285 |

Primary Examiner—Gary Chin
Attorney, Agent, or Firm—Andrus, Sceales, Starke & Sawall

[57] ABSTRACT

A system for optimizing the operating efficiency of a boat by balancing fuel consumption against cruising speed utilizes a comparison between engine speed and boat speed to effect automatic positioning of the drive unit. The measurements of boat and engine speed before and after an incremental change in vertical position or trim position are used to calculate the percent changes in boat speed and engine speed which, in turn, are used in conjunction with selected minimum and maximum incremental percentages to effect subsequent alternate control strategies. Depending upon the relative difference in the percent changes in boat and engine speeds, including adjustments based on the minimum and maximum incremental percents, the system will automatically continue incremental movement of the drive unit in the same direction, hold the drive unit in its present position, or move the drive unit an incremental amount in the opposite direction. Operating efficiency is optimized by eliminating incremental drive unit movement which results in an engine speed increase and consequent increase in fuel consumption which is disproportionate in the increase in boat speed attained.

16 Claims, 5 Drawing Sheets

FUEL CONSERVING CRUISE SYSTEM FOR A MARINE DRIVE UNIT

BACKGROUND OF THE INVENTION

The present invention relates to a system for controlling the position of a marine drive unit and, more particularly, to a system for automatically positioning a drive unit to economize fuel consumption at cruising speeds.

The drive units for marine propulsion devices, including outboard motors and stern drives, are supported from the boat transom by a drive mounting assembly. Various types of drive mounting assemblies are known, as for example a transom bracket for mounting an outboard motor directly on a boat transom or a gimbal ring assembly for similarly mounting a stern drive unit directly to the transom. Typically, a drive unit mounted directly on the boat transom may be trimmed by pivoting it about a generally horizontal axis in order to position the propeller and optimize thrust with respect to the plane of the boat. However, the vertical position of the drive unit usually cannot be changed beyond the somewhat limited amount which inherently results from the trimming operation. Therefore, the drive unit must typically be mounted in a compromise position at a fixed height with respect to the transom which will provide the best performance. Another type of drive mounting assembly is one which is capable of selectively supporting an outboard motor in either a raised or a lowered position aft of the boat transom. Many of these transom extension types of mounting assemblies are of the general type which include a pivotally connected quadrilateral linkage, generally in the form of a parallelogram.

Transom extension mounting assemblies have become increasingly popular on high performance boats powered by outboard motors, such as bass boats, where a lower position of the motor improves initial boat acceleration and a higher position enhances top speed by reducing gear case drag. Additionally, a higher motor position reduces draft, thereby enhancing shallow water operation. It is further known that relocating the motor aft of the transom improves the handling characteristics of most boats at high speeds. These devices also allow the boat to be built with a higher transom for improved safety in following wave conditions, thereby allowing boat builders to manufacture a common hull and transom design for both outboard and stern drive applications.

Examples of transom extension mounting assemblies for outboard motors, which support the motor spaced from the boat transom, are disclosed in the following U.S. Pat. Nos. 2,782,744; 3,990,660; 4,013,249; 4,168,818; 4,673,358; and 4,682,961. The first four of the foregoing patents disclose apparatus which is utilized to raise the motor vertically and the latter two patents describe apparatus which is utilized to trim the propeller and tilt the motor up and out of the water about a generally horizontal axis. In addition, U.S. Pat. applications Serial No. 092,168, filed Sep. 2, 1987; Ser. No. 100,216, filed Sep. 23, 1987; Ser. No. 103,508, filed Oct. 1, 1987; Ser. No. 172,399, filed Mar. 24, 1988; and Ser. No. 181,685, filed Apr. 14, 1988, all of which are assigned to the assignee of this application, disclose outboard motor transom extension mounting assemblies which utilize a quadrilateral linkage arrangement to raise and lower the motor with respect to the transom. The quadrilateral linkage comprises four pivotally connected links forming a collapsible linkage the movement of which effects vertical movement of the motor. Various of the foregoing co-pending applications disclose means for controlling the movement and positioning of transom extension mounting assemblies to avoid hazardous or undesirable operating conditions. The disclosed control systems operate automatically to lift or lower the motor with respect to the transom until the hazardous or undesirable operating condition is eliminated.

U.S. Pat. No. 4,318,699 discloses a system for automatically trimming a marine drive unit in response to a sensed operating condition, such as engine speed. A trimming operation involves tilting the drive unit about a horizontal axis to position the drive unit for on-plane and off-plane operation of the boat. The drive is typically trimmed out at high speeds and trimmed in at lower speeds. The system of the foregoing patent is automatically responsive to move the drive unit to preselected trim positions characteristic of the boat on which is used.

U.S. Pat. No. 4,718,872 describes a system for automatically adjusting the trim of a marine drive unit by sensing an increase in boat speed and adjusting the trim until the boat speed ceases to increase. The automatic control system is operative to incrementally move the drive unit in one direction as long as the movement results in an increase in speed and then to move the drive unit in the opposite direction as long as the adjustment results in an increase in speed. The control system thus hunts for optimal adjustment by trimming the drive unit back and forth in both directions until maximum boat speed at a particular throttle setting is achieved. However, basing an automatic trim adjustment on the occurrence of any increase in speed (or the absence thereof) may result in excessive hunting by the system and trim changes based on small changes in speed which are too insignificant to make any practical difference. In addition, although proper trim control has a significant impact on speed optimization, vertical lifting and/or lowering of the drive unit can also significantly affect speed optimization. Furthermore, trim and lift drive systems in a boat are generally independent and manual adjustment of each of them by an operator to attain optimum speed is somewhat difficult and requires substantial skill.

Commonly owned copending application entitled "Speed Optimizing Positioning System for a Marine Drive Unit," Ser. No. 218,686 filed on July 13, 1988, discloses a system for optimizing boat speed by automatically positioning the drive unit. The system is based on the measurement and use of an incremental speed change upon which alternative control strategies are based and automatically implemented. The measurement of boat speed before and after an incremental change in vertical position or trim position is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

The foregoing system has proved to be most effective in optimizing boat speed at selected cruising speed throttle settings. However, the system automatically positions the drive unit to obtain the highest boat speed even though an incremental speed increase may result in an incremental increase in fuel consumption which is not justifiable from a practical standpoint.

SUMMARY OF THE INVENTION

The present invention is directed to a system for simultaneously optimizing cruising speed and economizing fuel consumption by automatically positioning the drive unit based on a comparison of relative changes in boat speed (mph) and in engine speed (rpm) before and after drive unit adjustment. Operating efficiency, from the standpoint of reasonably good cruising speeds at fuel-saving engine speeds, is provided by automatically moving the drive unit in the direction which results in a relative boat speed change which is optimally better than the corresponding engine speed change.

The control system is automatically operable to incrementally move the drive unit in one direction as long as each incremental movement results in a relative engine speed change which is greater than the corresponding boat speed change by an amount less than a minimum incremental change. If the incremental movement of the drive unit results in a relative engine speed change which is greater than the corresponding boat speed change by an amount less than a maximum incremental change, the preceding incremental movement of the drive unit will be retained, but further incremental movement in the same direction is discontinued. If the relative speed change is greater than the boat speed change plus the maximum incremental change, the control system will automatically cause an incremental movement of the drive unit in the opposite direction.

In its preferred basic form, the control system strategy, which may be implemented with the use of a microprocessor, includes the steps of storing the boat speed and engine speed prior to raising the engine one increment, raising or lifting the engine one increment, pausing for a short time to allow the boat speed to stabilize, obtaining the boat speed and engine speed after the incremental lift, calculating the percent changes in boat speed and in engine speed and, alternatively, repeating the cycle to lift the engine another increment if the engine speed change is greater than the boat speed change by an amount less than a minimum incremental amount, temporarily discontinuing the incremental lifting of the drive unit if the engine speed change is greater than the boat speed change by an amount less than a maximum incremental amount, or lowering the engine by an incremental amount if the engine speed change is greater than the boat speed change by an amount in excess of the maximum increment. If the lift cycle is repeated at least once, pursuant to the first alternative step, the subsequent occurrence of either the second or third alternative step will effect termination of the optimization process. However, if either of alternative steps 2 or 3 takes place before an additional lift increment is effected pursuant to alternative step 1, the system preferably moves to a supplemental or second stage strategy similar to the first level strategy, except that it is based on incremental movement in the opposite direction (vertical downward movement in this embodiment).

Thus, the second level control system strategy operates according to the steps of storing the current boat and engine speed, lowering the engine one increment, pausing to allow the boat speed to stabilize, calculating the boat speed and engine speed after the incremental lowering, calculating the percent changes in boat speed and engine speed and, alternatively, repeating the cycle to lower the engine another incremental amount, temporarily discontinuing the incremental lowering, or raising the engine by an incremental amount, depending on the relative difference in the changes in boat and engine speed as indicated above.

The basic control strategy of the present invention can be applied to a trim system, as well as a lift system, or the two may be combined in a single system to optimize operating efficiency based on the control of both the lift system and the trim system. In one embodiment, a first level of optimization is obtained by adjusting the lift, in a manner previously described, further optimization is provided by adjusting the trim system in a similar manner, and the entire two system adjustment process may be automatically repeated for any desired number of passes. In another embodiment, cruising efficiency is optimized by successively adjusting the lift and trim, utilizing large incremental amounts of movement, and then performing the optimization again utilizing smaller increments of lift and trim. This embodiment may use a single or multiple passes or cycles.

DETAILED DESCRIPTION OF THE PREFERRED EMBODIMENT

Figure 1:
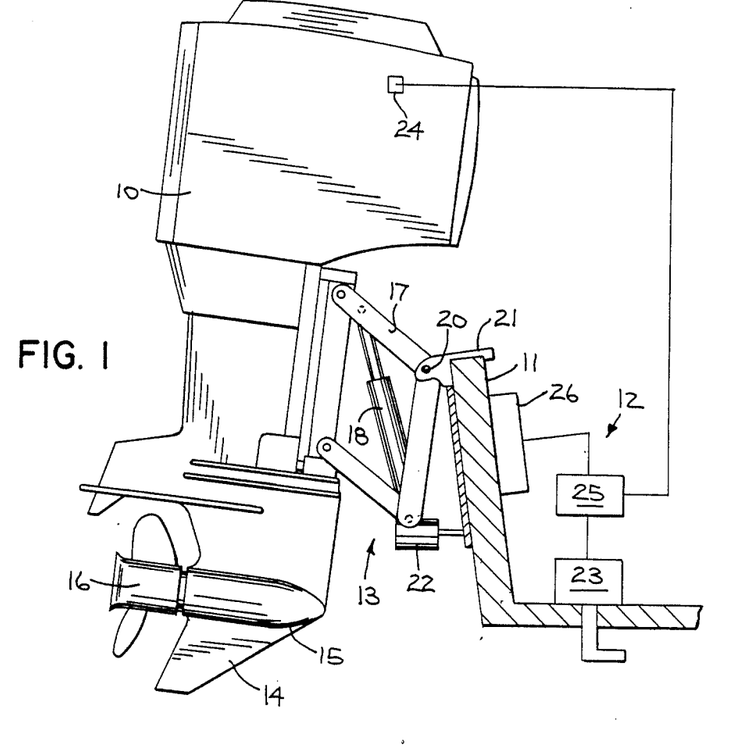
FIG. 1 is a side elevation of an outboard motor attached to a boat by means of a transom extension assembly which includes apparatus for lifting and for trimming the motor with respect to the boat.

In FIG. 1, an outboard motor 10 is mounted to the transom 11 of a boat 12 with a transom extension mounting assembly 13. The mounting assembly 13 positions the motor 10 aft of the transom and is adapted to provide vertical movement to lift or lower the motor with respect to the boat and to provide trim movement for limited tilting of the motor about a horizontal axis to vary the angle of the propulsive thrust vector with respect to the horizontal.

The outboard motor 10 includes the usual lower drive unit 14, including a gear case 15 and propeller 16. The transom extension mounting assembly 13 includes a pivotally connected quadrilateral linkage 17, opposite sides of which are interconnected by a lift cylinder 18. Extension of the lift cylinder causes the linkage 17 to collapse and the outboard motor 10 to be lifted vertically. Conversely, retraction of the lift cylinder 18 results in vertical lowering movement of the motor. The mounting assembly 13 is pivotally attached at its upper end to the upper end of a transom bracket 21 by a tilt pivot 20. A trim cylinder 22 (or cylinders) is attached to the lower end of the mounting assembly 13 and extension of the cylinder causes pivotal trimming movement of the mounting assembly and attached outboard motor about the tilt pivot 20 to vary the thrust vector of the drive unit 14.

The hydraulic pump, motor and reservoir for hydraulic fluid to operate the lift cylinder 18 and trim cylinder 22 may be mounted on the extension mounting assembly 13, in which case only electric power to operate the motor need be supplied to the assembly. Alternately, the pump, motor and reservoir may be mounted within the boat with appropriate hydraulic lines attached to the lift and trim cylinders. The lift and trim cylinders may each have an independent hydraulic system, including a separate motor, pump and reservoir, or, with appropriate valving and controls, the lift and trim cylinders may share a common motor, pump and reservoir.

Figure 2:
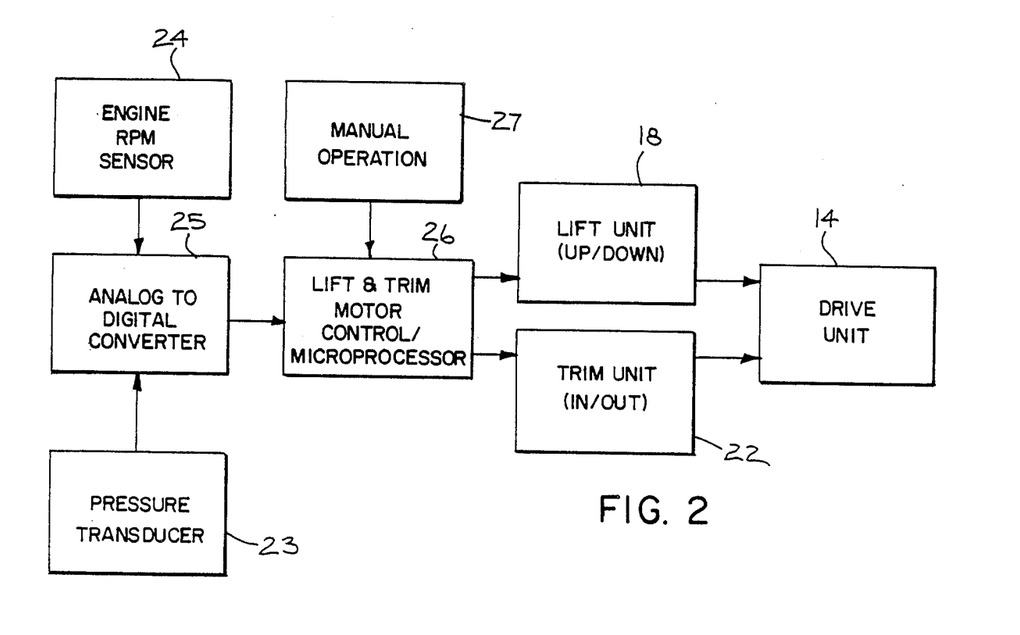
FIG. 2 is a block diagram of the control system of the present invention.

Boat speed (mph) which is one control function in the system of the present invention is measured by the usual combination 23 of a pitot tube and pressure transducer. The analog speed signal from the pressure transducer is fed to an analog to digital converter 25 to provide an input signal to the lift and trim motor control 26 which includes a programmed microprocessor. Engine speed, the other control function in the system, is measured by a conventional engine speed (rpm) sensor 24 operatively connected to the A/D convertor 25 and control 26.

The system includes a manual operation control 27 which overrides the automatic microprocessor control 26 to allow conventional manual operation of either the lift system or the trim system. The manual control 27 also includes an optimizing button 28 allowing the boat operator to enter the optimizing system to be hereinafter described. The system may be incorporated into a marine drive unit position control system of the type disclosed in commonly-owned copending patent application entitled "Operation Optimizing System for a Marine Drive Unit," filed concurrently with the present invention.

Figure 3:
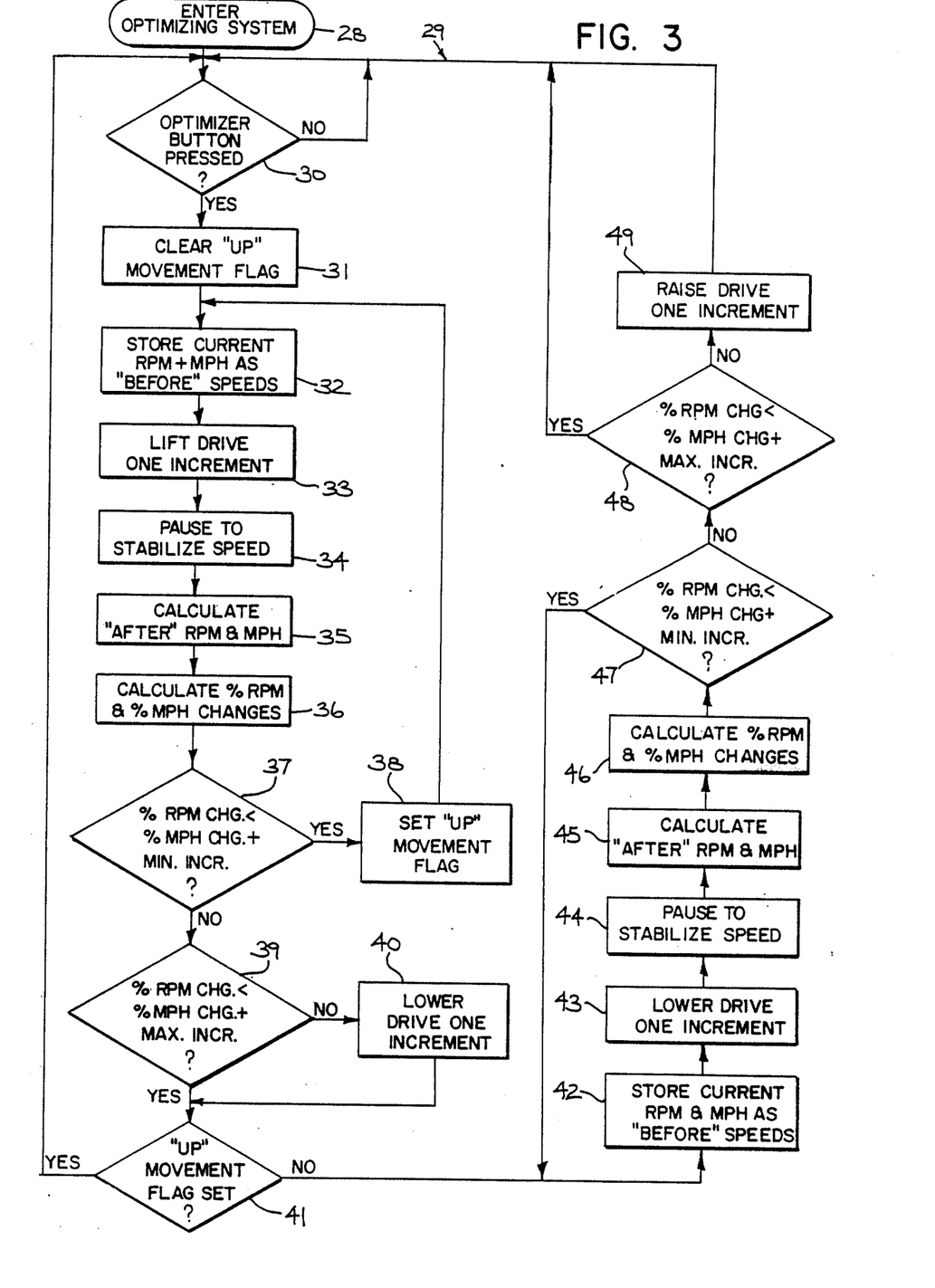
FIG. 3 is a logic diagram showing operation of a basic element of the optimization system based on lift control.

FIG. 3 shows an optimizing system 29 of the present invention operating on the basis of lift control only. Entry into the optimizing circuit at 28 keys the activation of decision step 30 to clear the "up" movement flag at process step 31 to effectively zero the system. At process step 32, the current boat and engine speeds (mph and rpm, respectively) are stored as the "before" speed values. "Before" is in reference to movement of the drive unit, in this case vertical movement. At the lift process step 33, the motor 10 including the drive unit 14 is automatically lifted vertically one increment. The incremental movement is based on a time signal programmed into the microprocessor. For example, operating the lift unit 18 for a period of one second might typically result in vertical movement of one inch. After the initial incremental lift, the system pauses at process step 34 to allow the boat speed to stabilize. At process step 35 the "after" engine speed (rpm) and boat speed (mph) are calculated. As with the "before" speeds, the "after" speeds are in reference to the incremental movement of the drive unit (in this case vertical lifting movement). The percent changes in before and after engine speed and before and after boat speed are calculated at process step 36.

The speed change percentage signals from process step 36 are then compared at decision step 37 to determine if the percent change in engine speed is greater than the percent change in boat speed by an amount less than a minimum incremental percent. The movement of the drive unit of a boat, regardless of direction, will generally result in a greater change in engine speed (rpm) than in boat speed (mph). However, the relative change in engine speed with respect to the change in boat speed provides an indication of the change in engine operating efficiency resulting from the change in drive unit position. For example, too large an increase in engine speed with respect to the increase in boat speed resulting from lifting the drive unit an incremental amount may result in an increase in fuel consumption which is not justified in comparison with the boat speed increase attained. The minimum incremental percent establishes a level of comparison between the percent change in engine speed and the percent change in boat speed to determine whether or not the preceding movement of the drive unit resulted in an operating efficiency sufficient to justify continuing incremental movement in the same direction. Thus, a percent change in engine speed which is less than the percent change in boat speed plus the minimum incremental percent is considered to be fuel efficient and to justify further incremental adjustment in the same direction. If, for example, a minimum incremental percent of 1% were selected and the total percent change in boat speed is 5%, the percent change in engine speed would have to be less than 6% to effect a subsequent incremental movement of the drive unit. Selection of the minimum incremental percent may require analysis of the boat and propellor design characteristics and may vary from one system to another.

If the percent change in engine speed, calculated at decision step 37, is greater than the percent change in boat speed by an amount less than the minimum incremental percent, the system operates at process step 38 to set an "up" or lift movement flag. The signal is stored for subsequent use, as will be hereinafter described. From process step 38 the system cycles back to process step 32 where the current or existing "after" speeds become the next "before" speeds and the system causes the drive to be lifted one more increment at 33, pauses for speed stabilization at 34, calculates a new after speeds at 35, calculates the percent changes in engine and boat speeds at 36, and again compares the percent change in engine and boat speeds at decision step 37. The preceding cycle repeats as long as the percent change in engine speed is greater than the percent change in boat speed by an amount less than the minimum incremental percent.

If the percent change in engine speed is not less than the percent change in boat speed plus the minimum incremental percent, determination is made at decision step 39 whether or not the percent change in engine speed is less than the percent change in boat speed plus a maximum incremental percent. If "yes", the system moves to next decision step. However, if "no", the lift cylinder 18 is automatically activated to retract and lower the drive unit one increment at process step 40. Lowering the drive unit at process step 40 is effected because the previous lift movement at process step 33 did not result in speed increase and may possibly even have resulted in an operating efficiency sufficient to cause the percent change in engine speed to fall even within the maximum incremental percent. Even if the comparisons at decision step 39 result in equality, the drive unit will automatically be lowered one increment to reestablish its previous position, because a lower drive position generally provides a better thrust characteristic and somewhat improved performance. The maximum incremental percent which may be, for example, twice the minimum increment is utilized in the speed change comparison to establish a minimal level of operating efficiency improvement.

From a "yes" output at decision step 39 or from process step 40, the system moves to decision step 41 where it is determined whether or not the up movement flag was set at process step 38. In other words, it is determined whether or not the comparison at decision step 37 resulted in at least one additional cycle of incremental lift to the drive unit. If the up movement flag has been set, the system will automatically deactivate. Alternatively and as will be described in more detail below, if the up movement flag has not been set, the output from decision step 41 may be utilized to initiate another level of optimization or to enter the system into another control strategy routine. Utilizing the up movement flag in the control strategy just described provides assurance that incrementally lifting the drive unit was the proper direction toward optimizing operating efficiency and that a basic level of optimization has been achieved. In other words, if the percent engine speed change resulting from the initial incremental lift at step 33 is greater than the percent change in boat speed by an amount in excess of the maximum incremental percent, it is assumed that the initial lift was in the wrong direction for optimization.

If the up movement flag has not been set, the output from decision step 41 proceeds to a second routine similar to that just described, but based on incremental lowering of the drive unit. Thus, at process step 42 the current boat speed and engine speed are stored as the existing before speeds. The drive is then lowered one increment at process step 43 and, at process step 44, the system again pauses to allow the boat speed to stabilize. At process step 45, the after engine and boat speeds resulting from lowering the drive unit at 43 are calculated. The percent changes in before and after engine speed and before and after boat speed are calculated at process step 46. The speed change percent signals are compared and, at decision step 47, the output depends on whether or not the percent change in engine speed is greater than the percent change in boat speed by an amount less than the minimum incremental percent, in a manner identical to decision step 37 previously described. A logically identical manner of stating the foregoing comparison is whether or not the percent change in engine speed is less than the percent change in boat speed plus the minimum incremental percent. If it is, the system recycles back to process step 42 and the drive is lowered one more increment. If the percent change in engine speed is not greater than the percent change in boat speed by an amount less than the minimum incremental percent, the system moves to decision step 48 where it is determined whether or not the percent change in engine speed is less than the percent change in boat speed plus a maximum incremental percent. If it is, optimization at this particular level is considered to have been attained and the output signal is utilized to deactivate the system, as shown, or alternately to continue into another level of control strategy or another control routine. If it is not, the output is processed at step 49 to raise the drive unit one increment. The output from process step 49 proceeds in the same manner as described for the affirmative output from decision step 48.

It should be noted that, because the system has already been checked to determine if initial lift movement of the drive unit was the proper direction for optimization (by utilization of the up movement flag at process step 38 and decision step 41), a similar flagging of down movement is not required in the subroutine just described.

As previously indicated, the system of the present invention may also be based on trim control or on a combination of lift control and trim control. Numerous other variations can be incorporated into either system, some of which will be described hereinafter.

Figure 4:
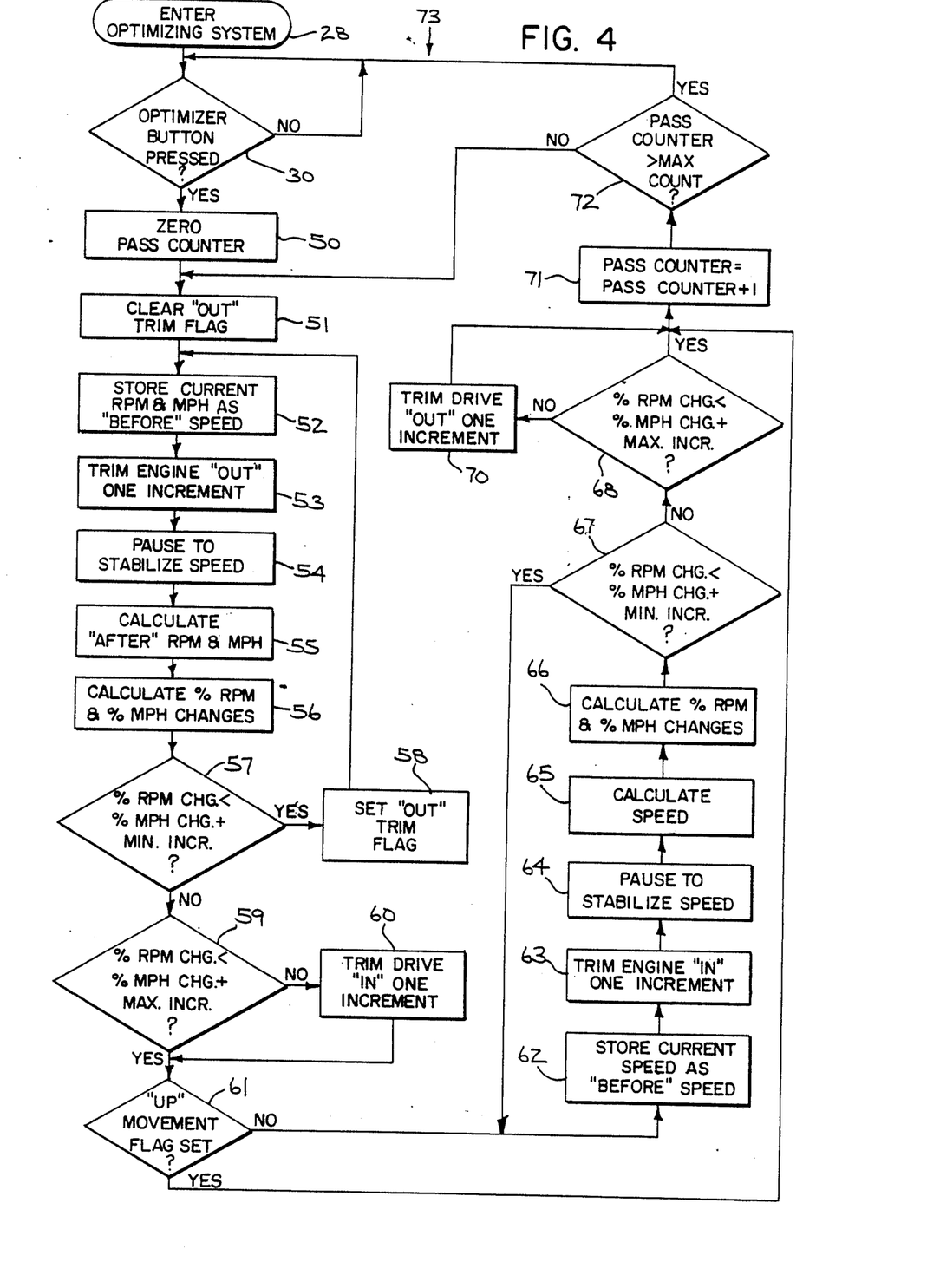
FIG. 4 is a logic diagram similar to FIG. 3 showing operation of a system based on trim control.

The logic diagram of FIG. 4 shows a speed optimization system based on trim control which system is similar to the lift control system of FIG. 3. As indicated, this system may be operated independently or may be combined with a lift control system to provide a high level of optimization by automatic sequential control of lift and trim. The system of FIG. 4 may be manually activated in the same manner as the previously described system by pushing the optimizing button 28 and activating the system at decision step 30. At process step 50, the pass counter, which keeps track of the number of repeat cycles through the system, is zeroed. It is understood, of course, that optimization may be attained with one complete system cycle and the pass counter may, therefore, be eliminated. Next, the trim out flag is cleared at process step 51 and the current engine speed and boat speed are stored as the "before" speeds at process step 52. The control 26 is then activated at process step 53 to cause the trim cylinder 22 to be extended and to trim the engine out one increment. The incremental trim movement is based on a time signal, as was the lift increment previously described, and a one second movement may change the trim angle by, for example, 2°. The system then pauses at process step 54 for a time sufficient to allow the boat speed to stabilize, and the engine and boat speeds resulting from the incremental trimming out are calculated at process step 55. At process step 56, the stored "before" speeds from process step 52 and the "after" speeds calculated at process step 55 are used to calculate the percent change in engine speed and the percent change in boat speed. The speed change percentages are compared and, at decision step 57, it is determined if the percent engine speed change is greater than the percent boat speed change by an amount less than a minimum incremental percent. The incremental percent may conveniently be the same as that used in the lift control routine or another increment may be utilized. If the percent engine speed change is greater by an amount less than the minimum increment, the out trim flag is set at process step 58 and the previously calculated after speeds from process step 55 are stored at process step 52 as the current before speeds. The system again proceeds through process steps 53, 54, 55 and 56 to trim the drive unit out an additional increment, pause to allow boat speed to stabilize, calculate the current after speeds, and calculate the percent speed changes, respectively. As long as the percent change in engine speed continues to exceed the percent change in boat speed by an amount not greater than the minimum incremental percent, the process will cycle through steps 52-58 and the drive unit will be trimmed out one additional increment with each cycle.

When the appropriate speed change comparison is no longer detected at decision step 57, a determination is made, at decision step 59 whether or not the percent change in engine speed is greater than the percent change in boat speed by an amount less than a maximum increment. (In other words, is the percent engine speed change less than the percent boat speed change plus the maximum incremental percent?) If it is, no change is effected. If it is not, the drive unit is trimmed in one increment at process step 60.

The out trim flag is then checked to see if it was set at process step 58 and, if it was, optimization based on the trim control routine is considered to have been completed and further trim adjustments are bypassed. If the out trim flag was not set (only one pass was made through process step 53 to trim the drive unit out one increment), the process continues to process step 62 where the current or last measured speeds are stored as the before speeds. The drive unit is then trimmed in one increment at process step 63. The reasoning for process step 63 is the same as that used in establishing process step 43 in the FIG. 3 control routine, namely, an absence of setting the out trim flag (step 58) suggests the possibility that initially trimming the drive unit out at process step 53 may actually have moved the unit away from the optimum position. Thus, the drive unit is either brought back to its original trim position prior to initiating optimization or, if the drive unit has already trimmed back (i.e., in) one increment at process step 60, the drive will be trimmed in another increment at step 63. Process steps 64 and 65 provide time to stabilize boat speed and to calculate the latest engine and boat after speeds, respectively. At process step 66, the percent changes in engine speed and boat speed are again calculated.

The determination is then made, at decision step 67, whether or not the trim in increment at 63 resulted in a percent change in engine speed which is greater than the percent change in boat speed by an amount less than the minimum increment. If "yes", the process recycles through steps 62–67 in a manner previously described, but without a decision step to set a trim flag as in step 57. If "no", decision step 68 determines if the percent change in engine speed is greater than the percent change in boat speed by an amount less than a maximum increment and, if it is, the optimization cycle is considered complete and the process exits to the pass counter incrementing process step 71. If at decision step 68 the percent change in engine speed is not greater than the percent change in boat speed by an amount less than a maximum increment, the drive unit is automatically trimmed out one increment at process step 70 from which the process continues to the pass counter incrementing process step 71.

The input to process step 71, which may be from decision steps 61 or 68 or process step 70, all indicative of the completion of one optimization cycle, causes the pass counter to increment by one and the total count is read at decision step 72 to determine if the pass counter total is greater than the maximum count programmed into the microprocessor. Thus, the control routine just described is designed to recycle through the optimization routine a number of times equal to the programmed pass count plus one. For example, if the program pass count were one, the system would automatically run two optimization cycles. Recycling through the optimization process provides a higher degree of optimization, but a single pass through the optimization routine, whether based on trim adjustment alone or incorporating a similar routine based on lift adjustment, may be adequate in many situations. If the pass counter at decision step 72 is at the set limit, the system is automatically deactivated. If the count has not reached the set limit, the system is reset and the process reentered between process steps 50 and 51 where the latter step causes the trim out flag to be cleared and the process to begin again.

Figure 5:
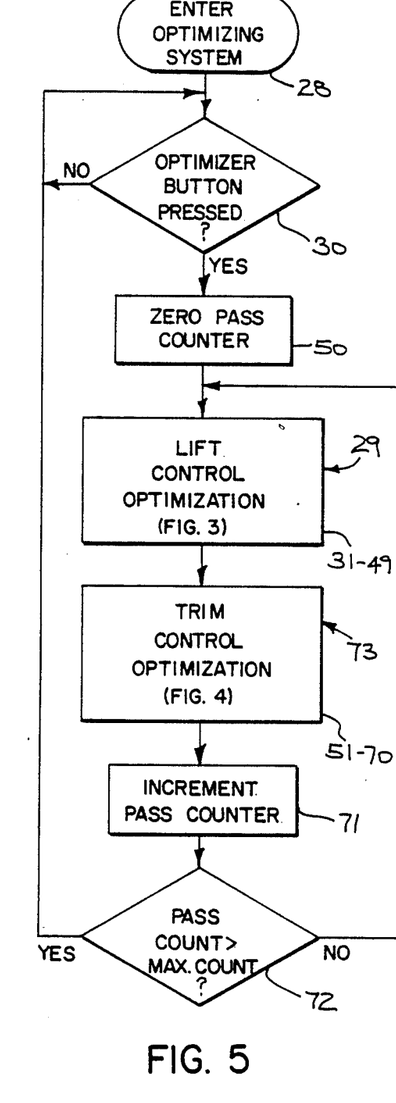
FIG. 5 is a generalized logic diagram showing one embodiment of an optimization system of the present invention utilizing both lift and trim control.

FIG. 5 is a more generalized diagram showing a logical combination of the optimization systems of FIGS. 3 and 4. The combined optimization system is entered at 28 by pressing the optimizing button. The corresponding "yes" response at decision step 30 results in zeroing of the pass counter at process step 50. The optimization routine 29 based on lift control is entered at process step 31 of FIG. 3 and continues through process step 49 (unless earlier exit from the routine occurs), where the process continues into the optimization routine based on trim control of FIG. 4, including steps 51 through 70. At process step 71 the pass counter is incremented by one and at subsequent decision step 72 it is determined if the pass count exceeds the preset maximum count. If it does the system is automatically deactivated and, if it does not, the system is set to recycle by reentry at process step 31.

Figure 6:
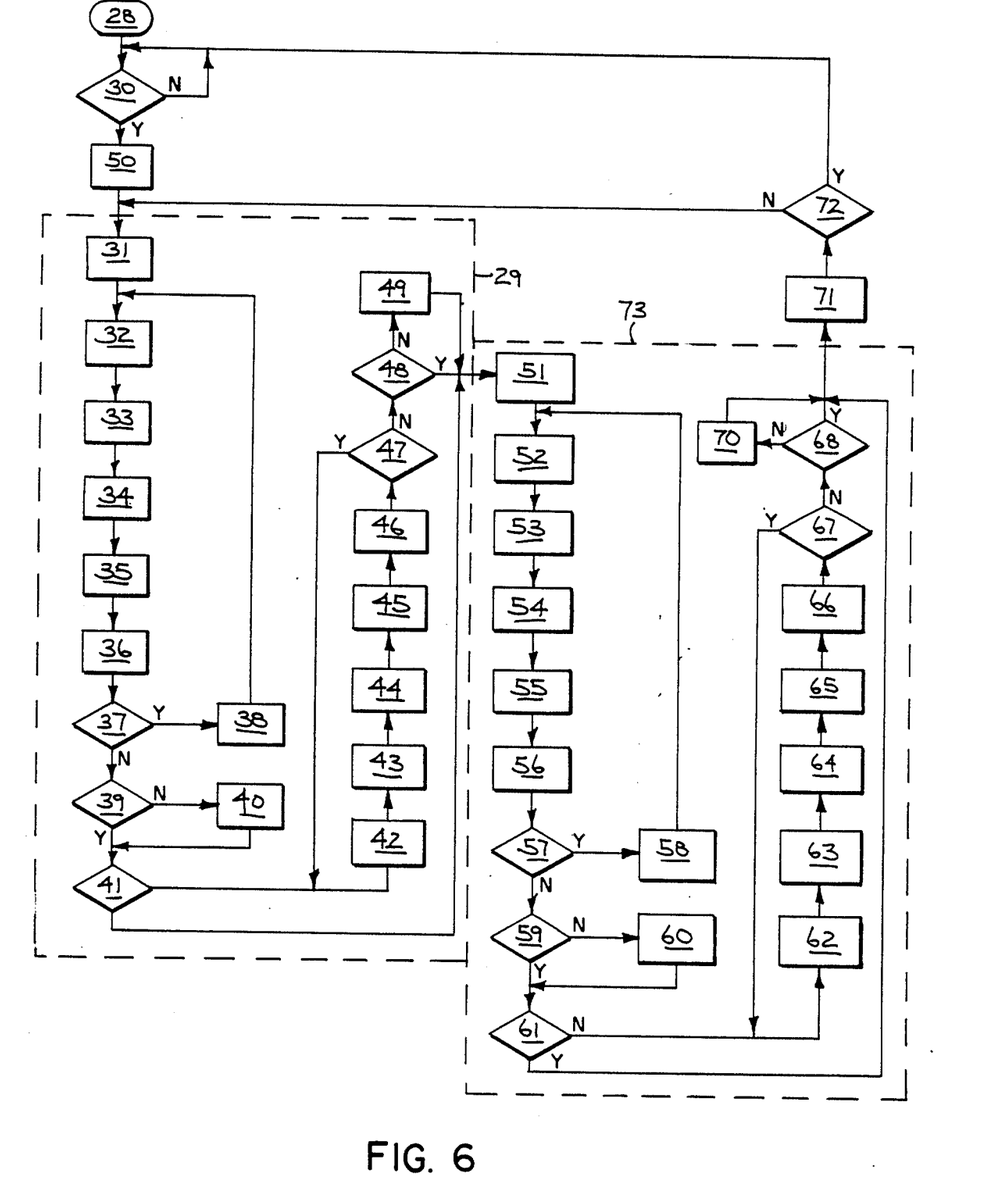
FIG. 6 is a detailed logic diagram of the optimization system of FIG. 5.

The detailed logic diagram of FIG. 6 shows exactly how the optimization systems 29 and 73 of FIGS. 3 and 4 are combined, as shown generally in FIG. 5, including the details of those changes in the FIG. 3 and 4 logic necessitated by the combination. To convert the optimization lift control system 29 of FIG. 3 from independent operation and combine it with the optimization system 73 based on trim control of FIG. 4, the logic "yes" output from decision step 41, the logic "yes" output from decision step 48 and the logic output from process step 49 proceed to process step 51 in the trim control system 73 of FIG. 4. The operation of the lift control system 29, shown in dashed lines in FIG. 6, is otherwise unchanged and corresponds to the generalized representation of the system 29 in FIG. 5. The basic operation of the optimization system 73 based on trim control is, likewise, essentially unchanged from the FIG. 4 embodiment. The dashed line box 73 encloses that portion of the system and corresponds to the generalized representation of the system 73 in FIG. 5.

To utilize the system of FIG. 6, a boat operator would typically bring the boat to a selected cruising speed by manual operation of the controls and then press the optimizing button 28. The system then automatically proceeds to adjust the vertical position of the drive unit pursuant to subsystem 29. When operation is optimized with respect to vertical position of the drive unit, the system automatically proceeds to subsystem 73 where the trim (horizontal thrust vector) of the drive unit is adjusted automatically to attain an optimum balance between cruising speed and fuel consumption for the throttle setting. When the pass counter at process step 71 has been incremented such that the total count is one greater than the maximum pass count programmed into the microprocessor, the logic process exits at decision step 72 to automatically deactivate the system. It is possible, however, to attain a substantial degree of optimization by utilizing the combined system of FIG. 6 without recycling through the use of a pass counter. In that case process steps 50 and 71 and decision step 72 are simply eliminated, and the logic output from subsystem 73 proceeds to decision step 30 to deactivate the system.

Figure 7:
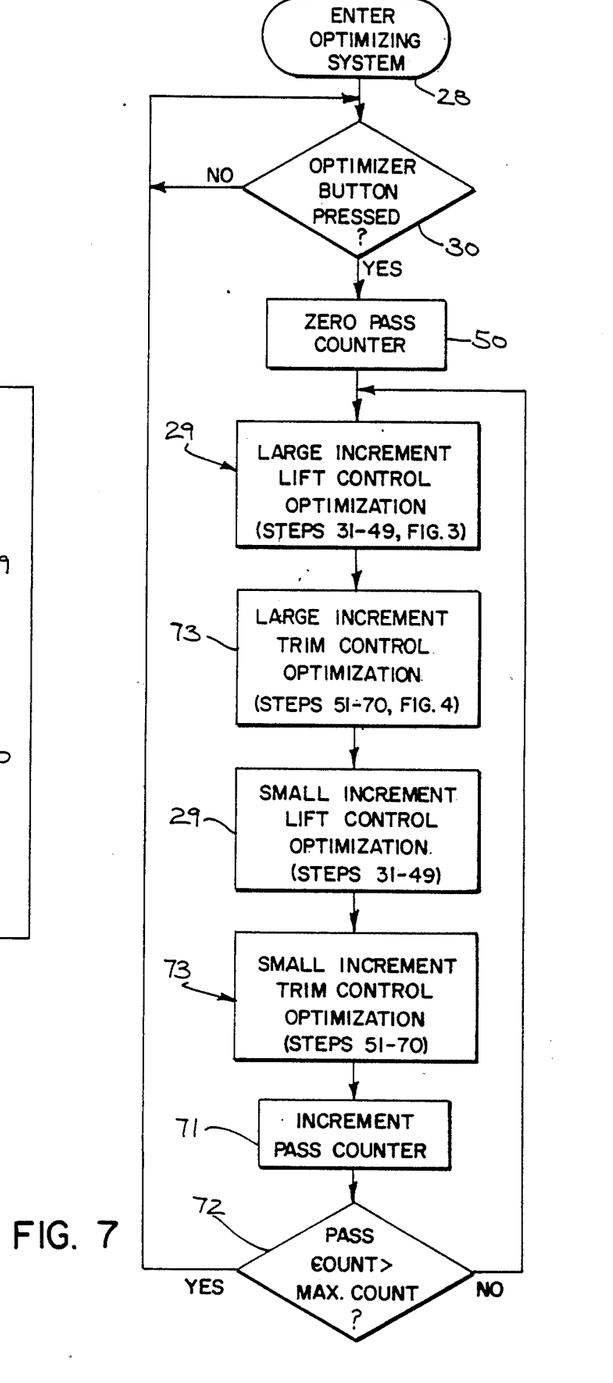
FIG. 7 is a generalized block diagram similar to FIG. 5 showing another embodiment of the invention.

An additional level of sophistication and a corresponding high level of optimization may be attained with the system embodiment shown in FIG. 7. The system of FIG. 7 is very similar to that shown in FIGS. 5 and 6, except that an additional optimization routine for both lift control and trim control, utilizing a smaller increment of drive unit movement, is added to the system. Thus, the system is designed to first proceed sequentially through subsystems 29 and 73 in the manner shown in FIG. 5 and then, utilizing increments of vertical lift movement and trim movement somewhat smaller (e.g. ½) than used initially, to sequentially repeat the subsystem routines 29 and 73. This expanded system may utilize a pass counter, but the level of speed optimization obtained with one complete cycle of the system is generally adequate and the pass counter may, therefore, be eliminated. In addition to using smaller increments of lift and trim movement in repeating the subsystem routines 29 and 73, the minimum and maximum incremental percents, utilized in decision steps 37, 39, 47 and 48 of the lift subsystem 29 and in decision steps 57, 59, 67 and 68 of the trim subsystem 73, may also be decreased. Other variations, such as elimination of one or the other of the small increment subsystems, may also be made.

Various modes of carrying out the invention are contemplated as being within the scope of the following claims particularly pointing out and distinctly claiming the subject matter which is regarded as the invention.

We claim:

1. A system for positioning an engine-driven marine drive unit with respect to a boat on which it is mounted to optimize fuel consumption at cruising speeds comprising:

means for moving the drive unit relative to the boat;
   means for sensing the boat speed and for providing an output signal indicative of the boat speed;
   means for sensing engine speed and for providing an output signal indicative of said engine speed;
   control means operative to cause the moving means to impart a first incremental movement in one direction to the drive unit and to compare the output signals of the boat speed and of engine speed before and after said first incremental movement, and to calculate the percent change in boat speed and the percent change in engine speed, and being selectively responsive to a first signal indicative of a percent engine speed change greater than the percent boat speed change by an amount less than a minimum incremental percent, a second signal indicative of a percent engine speed change greater than the percent boat speed change by an amount less than a maximum incremental percent, and a third signal indicative of a percent engine speed change greater than the percent boat speed change by an amount in excess of said maximum incremental percent, to cause the moving means, respectively, to continue said first incremental movement of the drive unit in the same direction, to discontinue said first incremental movement of the drive unit, and to impart a first incremental movement to the drive unit in the opposite direction.

2. The system as set forth in claim 1 wherein the output of said second signal after the output of said first signal is effective to deactivate the means for moving the drive unit.

3. The system as defined in claim 1 wherein the output of said second signal before the output of a first signal is effective to cause the moving means to impart a first incremental movement to the drive unit in the opposite direction.

4. The system as defined in claim 3 wherein the output of said third signal before the output of a first signal is effective to cause the moving means to impart an additional first incremental movement to the drive unit in said opposite direction.

5. The system as defined in claim 4 wherein the output of said third signal after the output of at least one first signal is effective to terminate further first incremental movement.

6. The system as defined in claim 4 wherein said control means is further operative to compare the output signals of boat speed and of engine speed before and after one of said first incremental movement in the opposite direction resulting from said second signal output and said additional first incremental movement in the opposite direction, and to generate additional first, second and third signals to cause the moving means, respectively, to continue said first incremental movement of the drive unit in the opposite direction, to discontinue said first incremental movement, and to impart a first incremental movement to the drive unit in said one direction.

7. The system as defined in claim 6 wherein said means for moving the drive unit comprises a lift apparatus and said first incremental movement is in a generally vertical direction.

8. The system as defined in claim 7 wherein said first incremental vertical movement is upward.

9. The system as defined in claim 8 wherein said means for moving the drive unit further comprises a trim apparatus, and said control means is operative to cause the trim apparatus to impart an incremental trim movement in one direction to the drive unit and to compare the output signals of boat speed and of engine speed before and after said incremental trim movement, and to calculate the percent change in boat speed and the percent change in engine speed, said control means being selectively responsive to a first trim signal indicative of a percent engine speed change greater than the percent boat speed change by an amount less than a second minimum incremental percent, a second trim signal indicative of a percent engine speed change greater than the percent boat speed change by an amount less than a second maximum incremental percent, and a third trim signal indicative of a percent engine speed change greater than the percent boat speed change by an amount in excess of said second maximum incremental percent, to cause the trim apparatus, respectively, to continue said incremental trim movement in the same direction, to discontinue said incremental trim movement, and to impart an incremental trim movement to the drive unit in the opposite direction.

10. The apparatus as defined in claim 9 wherein the control means is further responsive to one of said second and third trim signals in the absence of said first trim signal to cause the trim apparatus to impart an incremental trim movement to the drive unit in the opposite direction.

11. The system as defined in claim 9 wherein the output of said third trim signal before the output of a first trim signal is effective to cause the trim apparatus to impart an additional incremental trim movement to the drive unit in said opposite direction.

12. The system as defined in claim 11 wherein the output of said third trim signal after the output of at least one first trim signal is effective to terminate further incremental trim movement.

13. The system as defined in claim 12 wherein said control means is further operative to compare the output signals of boat speed and of engine speed before and after one of said incremental trim movement in the opposite direction resulting from said second trim signal output and said additional incremental trim movement in the opposite direction, and to generate additional first, second and third trim signals to cause the trim apparatus, respectively, to continue said incremental trim movement in the opposite direction, to discontinue said incremental trim movement, and to impart an incremental trim movement to the drive unit in said one direction.

14. The system as defined in claim 13 wherein said control means is further operative to automatically recycle after response to one of said additional first, second and third signals and one of said additional first, second and third trim signals.

15. The system as defined in claim 14 wherein said control means includes counter means responsive to one of said additional signals and one of said additional trim signals to limit the automatic recycling to a selected number of cycles.

16. The system as defined in claim 14 wherein the control means is operative to decrease the amount of said first incremental movement and said incremental trim movement prior to recycle.

* * * * *